(12) United States Patent
Maeda

(10) Patent No.: US 6,542,454 B2
(45) Date of Patent: Apr. 1, 2003

(54) PICKUP DEVICE

(75) Inventor: Takanori Maeda, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 105 days.

(21) Appl. No.: 09/897,413

(22) Filed: Jul. 3, 2001

(65) Prior Publication Data
US 2002/0039342 A1 Apr. 4, 2002

(30) Foreign Application Priority Data
Jul. 5, 2000 (JP) .................... 2000-203822

(51) Int. Cl.⁷ ................................ G11B 7/00
(52) U.S. Cl. ............... 369/112.23; 369/112.23; 369/44.14; 369/53.18
(58) Field of Search ............ 369/112.01, 112.05, 369/112.23, 44.11, 44.12, 44.14, 44.23, 44.27, 44.32, 47.1, 53.1, 53.12, 53.18, 53.28

(56) References Cited
U.S. PATENT DOCUMENTS
5,648,943 A * 7/1997 Omi et al. ............... 369/13.12
6,314,064 B1 * 11/2001 Ueda et al. ............... 369/44.23

* cited by examiner

Primary Examiner—Muhammad Edun
(74) Attorney, Agent, or Firm—Morgan, Lewis & Bockius LLP

(57) ABSTRACT

Disclosure is a collision preventive device of a pickup device in an apparatus for performing recording or reproducing, with relative movement, to or from an optical information recording medium recorded with information on a track. The device includes a contact portion to be contacted with a surface of the optical information recording medium earlier than an objective lens when the objective lens approaches the surface of the optical information recording medium, and a non-contact portion provided adjacent the contact portion not to be contacted with the surface of the optical information recording medium in an area corresponding to a path of a light spot defined by a diameter of the light spot of a light beam on the track.

2 Claims, 12 Drawing Sheets

//PICKUP DEVICE

BACKGROUND OF THE INVENTION

1. Field of the Invention

The present invention relates to a pickup device for recording or reproducing information to or from an optical information recording medium, such as an optical disc, recorded with information on the track. More particularly, the invention relates to a buffer pad attached to an objective lens or a driving part used in the pickup device.

2. Description of the Related Art

In recent years, the optical discs of the optical information recording media are broadly used as means for recording and reproducing data such as images and sound. In a recording/reproducing apparatus, such information is recorded or reproduced to or from a track of the optical disc by the pickup device relatively moving thereto. To the pickup device, there is a demand for further increase of density and reduction of size. In the objective lens of the pickup device, the numerical aperture for example is given 0.45 for the CD (Compact Disc) and 0.6 for the DVD (Digital Versatile Disc). Furthermore, the effective diameter of the objective lens has decreased from nearly 4.5 mm in the conventional to nearly 3 mm. As an influence of size reduction for the pickup device, so-called the working distance of between the tip end of the objective lens and the surface of the optical disc has been decreased. As compared with the conventional structure, there is increased possibility of collision of the objective lens with the optical disc surface.

Furthermore, the thickness of the transmissive substrate, while 1.2 mm for the CD, is 0.6 mm for the DVD. Because the distance is shortened to the recording surface protected by the transmissive substrate, there is increased influence upon the signal based on the injury on the optical disc surface caused by collision of the objective lens.

Meanwhile, recently the advent of the DVD-RW (Digital Versatile Disc-Rewritable) standard has allowed the user to make record onto the optical disc. During data recording by the user, the presence of injury on the disc surface might cause a serious affection.

For a recording/reproducing apparatus for recording/reproducing information on an optical disc loaded therein, a focus servo and a tracking servo are essential for always accurately converging light beams for writing and reading information to a pit train or the like formed spirally or concentrically on a recording surface of the optical disc. The focus servo performs a positional control for an objective lens, used to irradiate a pit train on the optical disc with light beams, in an optical axis direction so as to reduce a focus error, i.e., an error of the position of the objective lens in the optical axis direction with respect to the focus position of the objective lens. The tracking servo performs a positional control for the position of the objective lens, used to irradiate a pit train on the optical disc with light beams, with respect to a recording track in a radial direction of the optical disc, so as to reduce a tracking error, i.e., an error of the objective lens with respect to the pit train recording track position.

Figure 1:
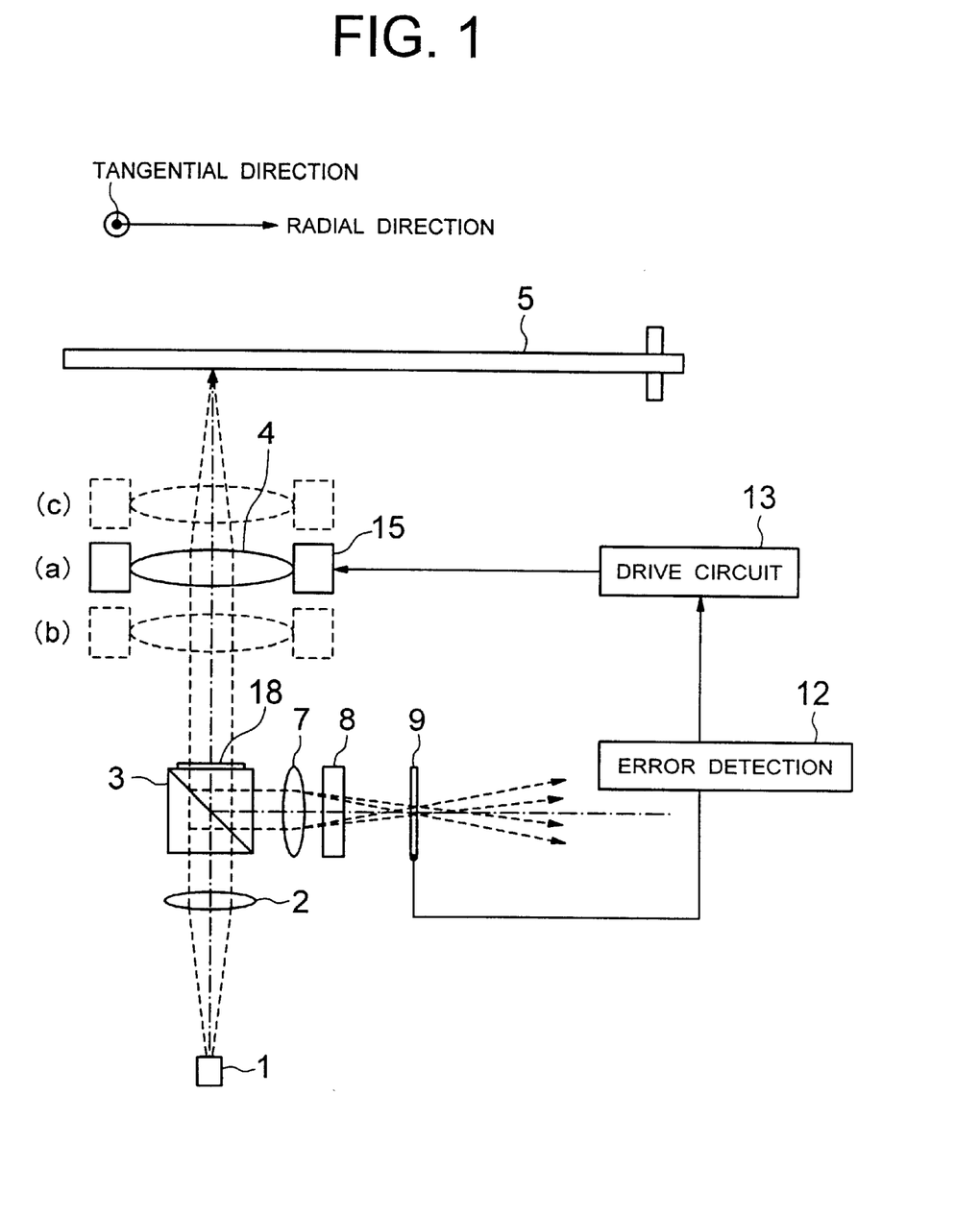
FIG. 1 is a schematic diagram illustrating the structure of an optical pickup device.

FIG. 1 illustrates a conventional optical pickup device using an astigmatism method. A laser beam from a semiconductor laser 1 is transformed into a parallel laser beam by a collimator lens 2, passes through a polarizing beam splitter 3 and a ¼ wavelength plate 18, and is converged by an objective lens 4 toward an optical disc 5 to form a light spot onto a pit train on an information recording surface of the optical disc 5.

Figure 2A:
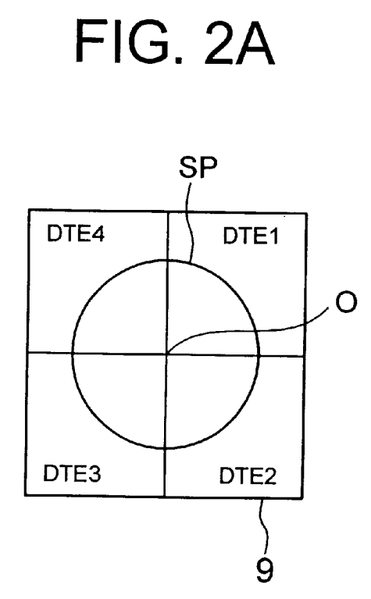
FIGS. 2A, 2B and 2C are plan views each illustrating variations in shape of a beam spot on a light receiving surface of a photodetector.
Figure 2B:
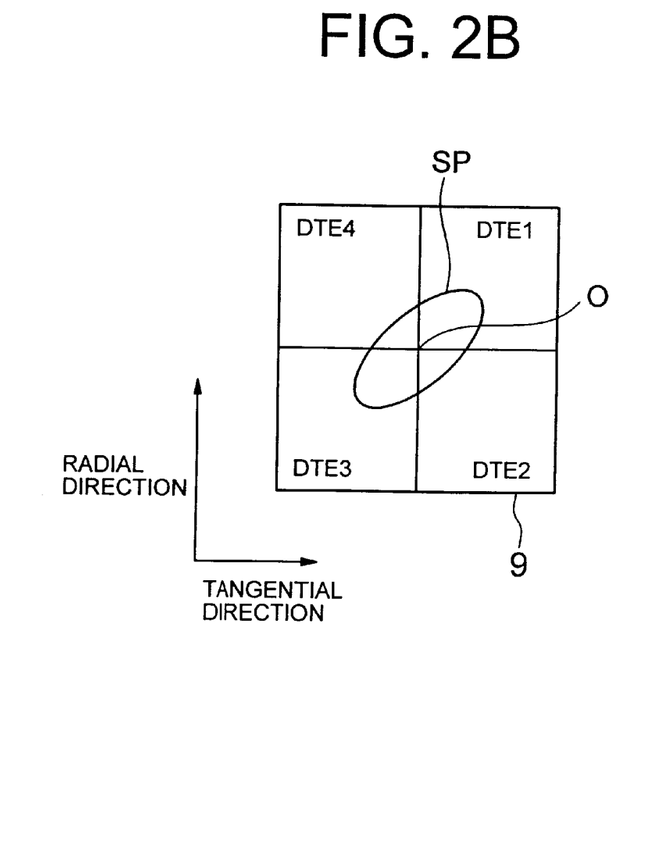
Figure 2C:
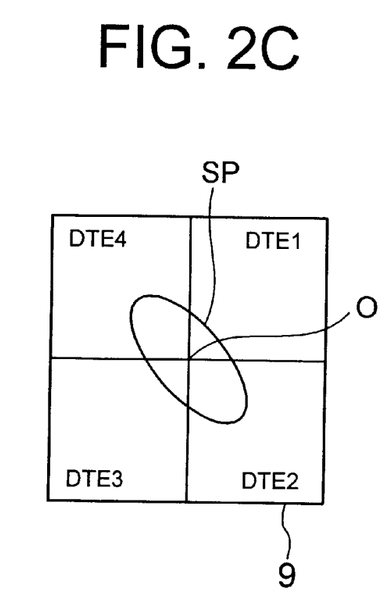

Light reflected from the optical disc 5 is converged by the objective lens 4 and directed by a beam splitter 3 to a detecting lens 7. Converged light formed by the detecting lens 7 passes through an astigmatism generating element 8 such as a cylindrical lens, multi lens and the like, to form a spot near the center 'O' of a light receiving surface of a quadrant photodetector 9 having four light-receiving surface areas (elements) divided by two orthogonal line segments. The multi lens 8 irradiates the quadrant photodetector 9 with a light spot SP in the shape of true circle as illustrated in FIG. 2A when the laser beam is converged on the recording surface of the optical disc 5 in focus, and an elliptic light spot SP, extending in an orthogonal direction of the elements as illustrated in FIG. 2B or 2C when the converged laser beam is out of focus on the recording surface of the optical disc 5 (FIG. 2B illustrates the light spot SP when the objective lens 4 is too far from the optical disc 5, while FIG. 2C illustrates the light spot SP when the objective lens 4 is too near the optical disc 5 shown in FIG. 1), thus generating so-called astigmatism.

The quadrant photodetector 9 opto-electrically transduces the light spot irradiated to the four light receiving surface areas into respective electric signals which are supplied to a focus error detecting circuit 12. The focus error detecting circuit 12 generates a focus error signal (FES) based on the electric signals supplied from the quadrant photodetector 9 and supplies the focus error signal to an actuator driver circuit 13. The actuator driver circuit 13 supplies a focusing driving signal to an actuator 15. The actuator 15 drives the objective lens 4 in response to the focusing driving signal in the optical axis direction.

Figure 3:
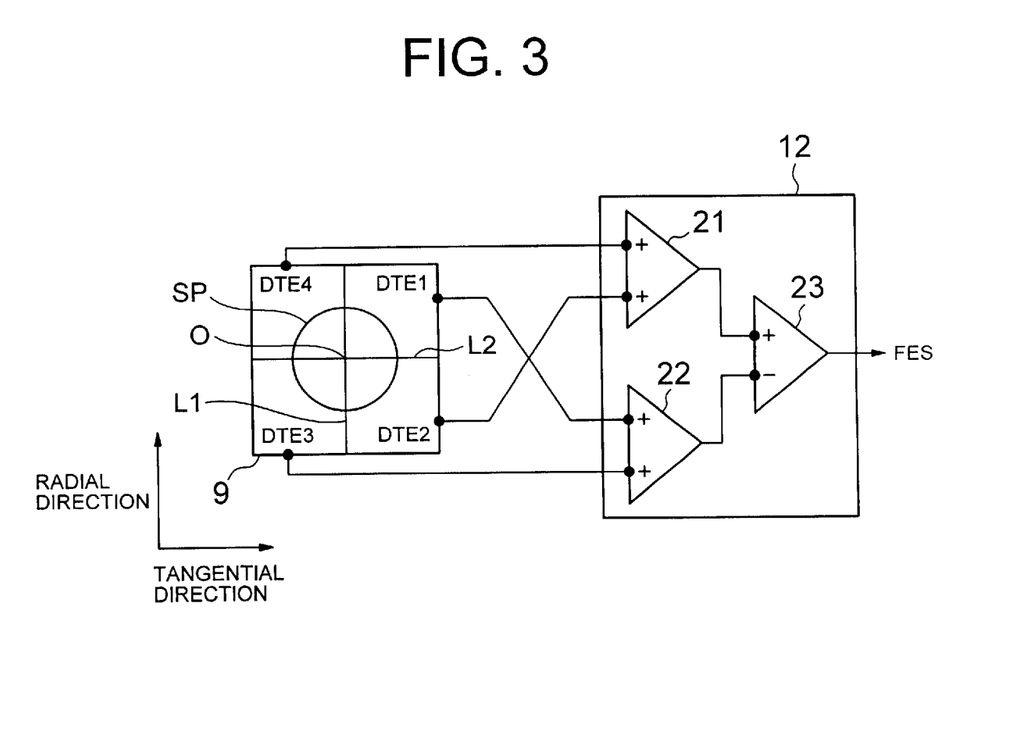
FIG. 3 is a schematic circuit diagram illustrating a focus error signal generator in an optical pickup device.

The focus error detecting circuit 12, as illustrated in FIG. 3, is connected to the quadrant photodetector 9, where the quadrant photodetector 9 is composed of four detecting elements DET1 to DET4 in first to fourth quadrants which are located adjacent to each other with two orthogonal division lines L1 and L2 interposed therebetween and which are independent of each other. The quadrant photodetector 9 is positioned such that the division line L2 is in parallel with a tangential direction with respect to the extending direction of the recording track, and the other division line L1 is in parallel with the radial direction of the same. Respective opto-electrically transduced outputs from the elements DET1 and DET3, symmetric with respect to the center 'O' of the light receiving surface of the quadrant photodetector 9, are added by an adder 22, while respective opto-electrically transduced outputs from the elements DET2 and DET4, also symmetric with respect to the center 'O' of the light receiving surface, are added by an adder 21, and outputs from the respective adders 21 and 22 are supplied to a differential amplifier 23. The differential amplifier 23 calculates the difference between the supplied signals, and outputs a signal indicative of the difference therebetween as a focus error signal (FES).

Figure 4:
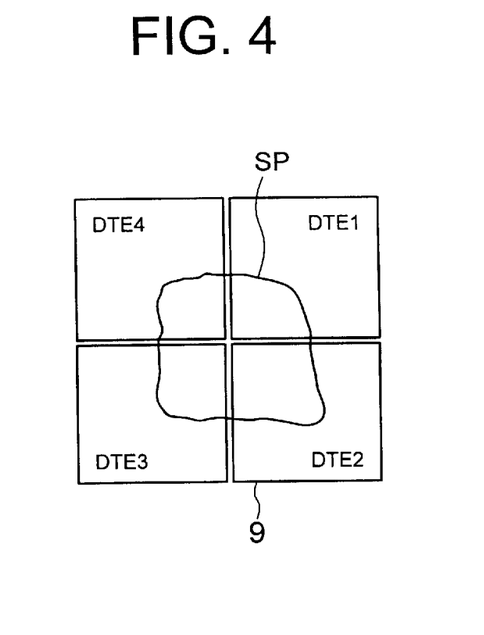
FIG. 4 is a plan view illustrating a light receiving surface of the photodetector light with a light beam spot illuminated.

In the focus error detecting circuit 12, the outputs of the quadrant photodetector 9 are added by the adders 21 and 22, respectively, and the differential amplifier 23 calculates the difference between the outputs of the adders 21 and 22 to generate a focus error component. In this event, when the light beam is in focus, the light spot in the shape of true circle as illustrated in FIG. 2A is formed on the quadrant photodetector 9, where a spot intensity distribution is symmetric with respect to the center 'O' of the light receiving surface of the quadrant photodetector 9, i.e., symmetric in the tangential direction and in the radial direction, so that the values resulting from the additions of the opto-electrically transduced outputs from the elements on the diagonals are equal to each other, with the focus error component being calculated to be "zero". On the other hand, when the light beam is out of focus, i.e., an elliptic light spot extending in a diagonal direction as illustrated in FIG. 2B or 2C is formed on the quadrant photodetector 9, so that the values resulting from the additions of the opto-electrically transduced outputs from the elements on the diagonals are different from each other. Thus, the focus error component output from the differential amplifier 23 exhibits a value corresponding to the focus error. Specifically, assuming that the references designated to the elements of the quadrant photodetector 9 represent the outputs thereof, the focus error signal FES is expressed by the following equation:

$$FES=(DET1+DET3)-(DET2+DET4).$$

Where the optical disc is injured on the surface or the optical disc has fine bubbles in a transparent cover layer thereof, the light spot on the photodetector is disturbed in shape by the influence thereof. As shown FIG. 4, if the light spot SP on the light-receiving surface of the quadrant photodetector 9 is disturbed in shape despite of a proper distance of the objective lens from the optical disc, then a pseudo focus error signal occurs having the same polarity as that of the optical disc in far distance in focus servo system. The pseudo focus error signal causes current flow to a driving mechanism for the objective-lens of a drive part in the pickup device. As a result, the objective lens may be driven forcibly toward the optical disc. Due to this, a pseudo error signal is incidentally generated great or the objective lens cannot be returned to a correct position even after passing an injured region due to overlap with the vibration of the pickup device and optical disc, resulting in collision between the objective lens 4 and the optical disc 5. If the injury is in an initial stage and light in extent, an instantaneous focus error signal occurs but servo operation is recovered immediately after passing the injury. However, if injury is deep, reading would be impossible.

In the conventional CD reproducing device, because the numerical aperture NA of the objective lens is small with great focus depth, a certain degree of noise over the focus error signal (FES) will not cause a problem of focus error. However, where reading information out of an optical disc such as a DVD-RW, a working distance is short and the objective-lens numerical aperture is great with small focus depth. Accordingly, there is increased effect of the noise contained in the focus error signal upon focus servo.

Due to this, particularly in the situation of causing injury to the optical-disc surface, the objective lens is contacted with the optical-disc surface repeatedly in a particular track position. With such contact, the surface area the light beam passes is injured when the objective lens traces the track area, inducing further contact occurrence. This results in a problem that signal recording or reproducing to or from the track is difficult.

OBJECT AND SUMMARY OF THE INVENTION

The present invention has been made in view of the foregoing points, and it is an object to provide a pickup device having a collision preventive function capable of suppressing the spread of damage caused due to collision between the objective lens and the optical-disc surface.

A device according to the present invention is a pickup device in an apparatus for performing recording or reproducing, with relative movement, to or from an optical information recording medium recorded with information on a track, which comprises:

an objective lens for focusing a light beam to a track on a recording surface of an optical information recording medium;

a drive part supporting the objective lens to control a position thereof relatively to the optical information recording medium; and a collision preventive device provided on the objective lens or drive part to prevent direct contact between the objective lens and a surface of the optical information recording medium; wherein the collision preventive device includes a contact portion to be contacted with the surface of the optical information recording medium earlier than the objective lens when the objective lens approaches the surface of the optical information recording medium, and a non-contact portion provided adjacent the contact portion not to be contacted with the surface of the optical information recording medium in an area corresponding to a path of a light spot defined by a diameter of the light spot of a light beam on the track.

In one aspect of the pickup device according to the present invention, said optical information recording medium is an optical disc recorded with information concerning said optical information recording medium in a lead-in or lead-out region existing in an inner periphery or outer periphery thereof, said contact portion being positioned on an inner or outer side of said lead-in or lead-out region of said optical disc when said objective lens focuses a light beam to said lead-in or lead-out region.

In the invention, because the collision preventing device, i.e., buffer pad is provided in the vicinity of the objective lens to structure a protection pad for contact avoiding the track area to be read, in which the non-contact portion of the buffer pad is not contacted with an area of the surface of the disc within an effective diameter of the light spot on the track (in this paper, such area is also referred merely to as "effective diameter") under recording or reproducing. Thus, it is possible to prevent against a chain of spread of collision damage due to the objective lens. Also, because in the innermost periphery of the optical disc the optical-disc information region is structurally avoided in contact, prevention is made against a chain of spread of collision damage due to the objective lens.

DETAILED DESCRIPTION OF THE PREFERRED EMBODIMENTS

Now, embodiments of the present invention will be explained with reference to the accompanying drawings.

Figure 5:
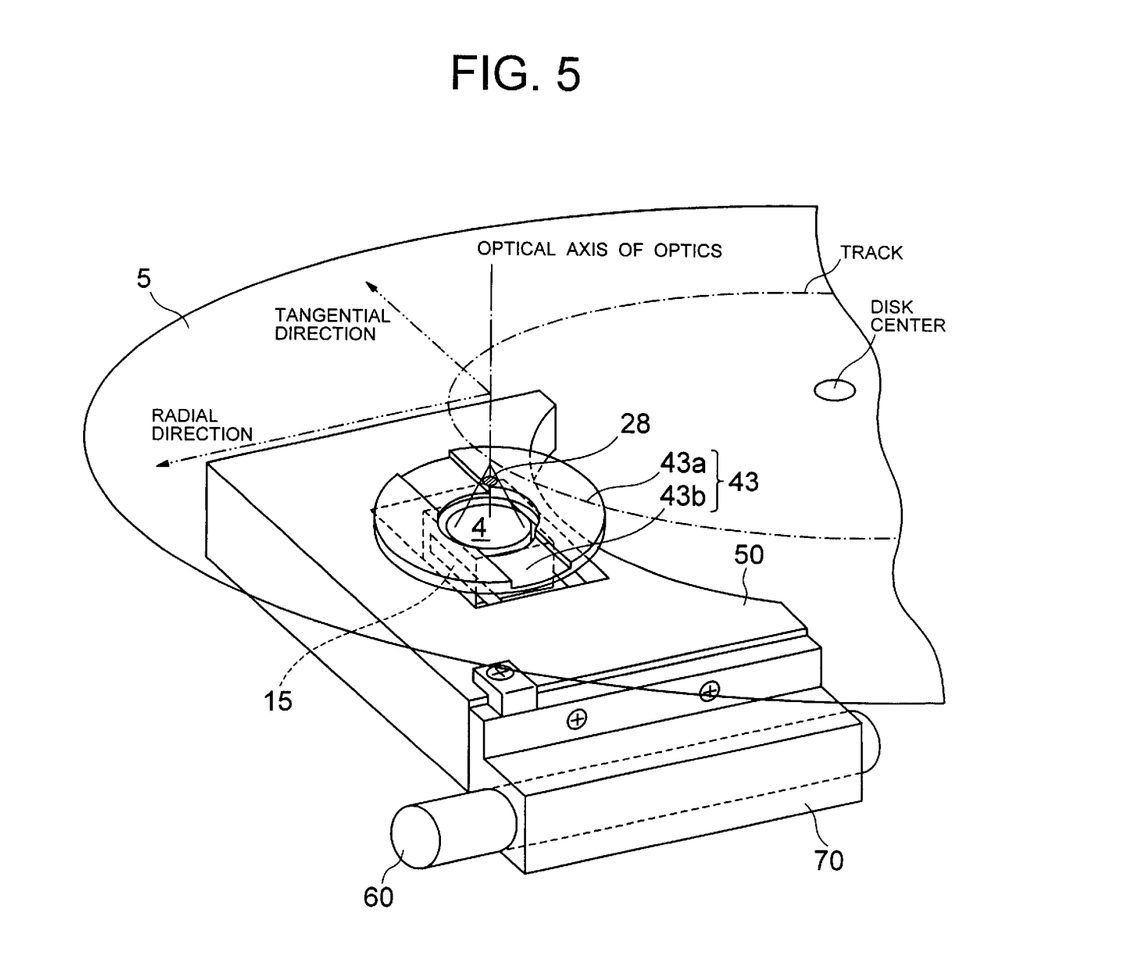
FIG. 5 is a schematic perspective view showing an optical pickup device of an embodiment according to the present invention.

FIG. 5 shows a first embodiment of an optical pickup device using an example of a collision preventive mechanism based on the invention. In the figure, 50 is a pickup main body unit, 4 is an objective lens, 15 is an objective lens-driving part for driving the objective lens, 43 is a buffer pad based on the invention, 43a is a contact portion of the buffer pad, 43b is a non-contact portion of a recess of the buffer pad or the like and 5 is an optical disc. Meanwhile, 28 shows a light spot on the optical disc formed by a light beam during recording or reproducing (such a light spot has an area within the "effective diameter"). The buffer pad 43 of the invention is formed using a material lower in hardness than the light transmissive layer on the recording surface of the optical disc 5.

Figure 6:
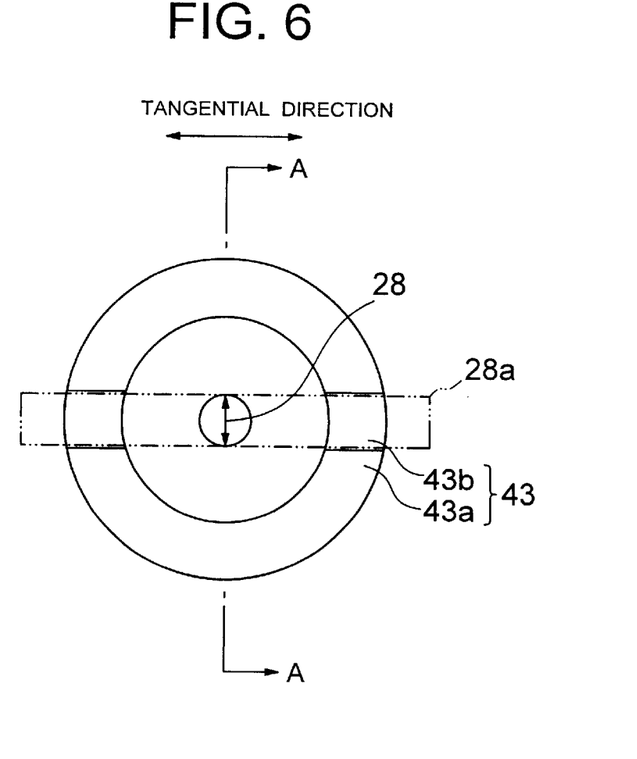
FIG. 6 is a plan view showing s buffer pad in an optical pickup device of the embodiment according to the invention.

As shown in FIG. 6, the buffer pad 43, as an annular flat plate, includes a contact portion 43a to be brought into contact with a surface of the optical disc 5 earlier than the objective lens 4 when the objective lens 4 comes near the surface of the optical disc 5, and a non-contact portion 43b provided adjacent the contact portion and not to be contacted with the surface of the optical disc 5 in an area corresponding to a path 28a of a light spot defined by a diameter of the light spot 28 of the light beam on the track.

As shown in FIG. 5, the optical pickup device has an objective lens 4 and a main body unit 50. The main body unit 50 includes a light source such as a semiconductor laser for emitting a light beam, and further has a detecting optical system including an illuminating optical system for guiding a light beam to the objective lens and light detecting means to guide the reflection light from the optical disc to the light detecting means through the objective lens.

In a periphery of a side surface of the objective lens 4 are provided an elastic support member such as a leaf spring for supporting the objective lens 4 on the main body unit 50 and an objective lens drive part 15 such as an actuator for driving the objective lens 4 in a radial direction and focusing direction of the optical disc in order to focus the optical beam toward an information recording surface of the optical disc 5. The objective lens supported by the elastic support member is attached in a holder. The objective lens drive mechanism has a coil, cooperating with the holder to extend in the radial direction and focusing direction, and a magnetic circuit.

As shown in FIG. 5, the main body unit 50 is fixed on a slider 70 moving over a shaft 60 extending in the radial direction of the optical disc 5. The slider 70 allows the main body unit 50 to roughly move in the radial direction of the optical disc 5.

The main body unit 50 has, therein, an illuminating optical system formed by a semiconductor laser for emitting linear polarization light, a collimator lens, a polarization light beam splitter, a ¼-wavelength plate and a rising reflection mirror, and a detecting optical system having an astigmatism generating element formed by a rising reflection mirror, a ¼-wavelength plate, polarization light beam splitter, a detecting lens system, etc. and a quadrant photodetector, although these are not shown.

Now, the operation of the present embodiment will be explained.

Figure 7:
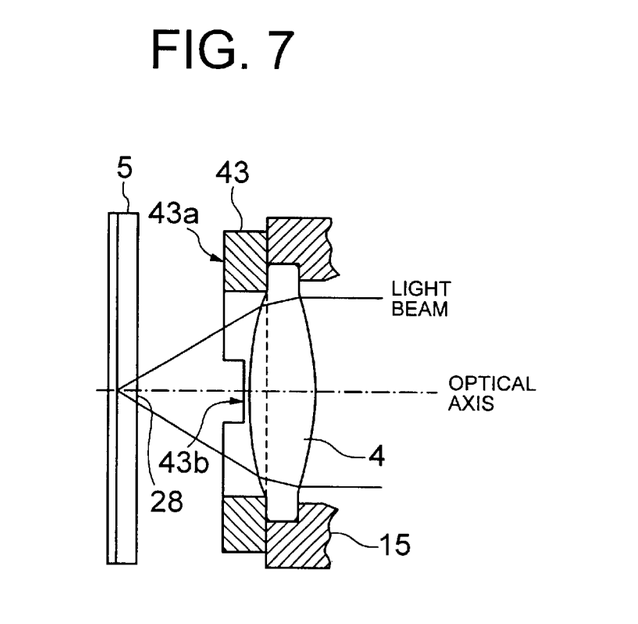
FIG. 7 is a sectional view taken along line A—A in FIG. 6.

During usual recording or reproducing, the objective lens 4 as shown in FIG. 7 is controlled in position relative to the optical disc 5 by the focus servo mechanism, to keep a predetermined working distance between a top end surface of the contact portion 43a of the buffer pad and a surface of the optical disc. The working distance of the objective lens is, for example, nearly 100 μm.

The buffer pad 43 is provided with the non-contact portion 43b in a recess form or the like to avoid the pad from contacting within a path 28a of the light spot reading the track. Due to this, there is no increase of flaw on the track surface as a cause of pseudo focus error. Also, there is no further deterioration of a pseudo error signal caused due to bubbles in the transparent layer on the recording surface.

The contact area on the contact portion 43a of the buffer pad can be provided broad. Accordingly, in the absence of a flaw, there is slight effect upon signal recording or reproducing outside the light-spot path. This will provide a great effect for the case that focus servo is placed unstable by flawing further to the flawed light-spot path.

Second embodiment of the present invention will be described below.

Figure 8:
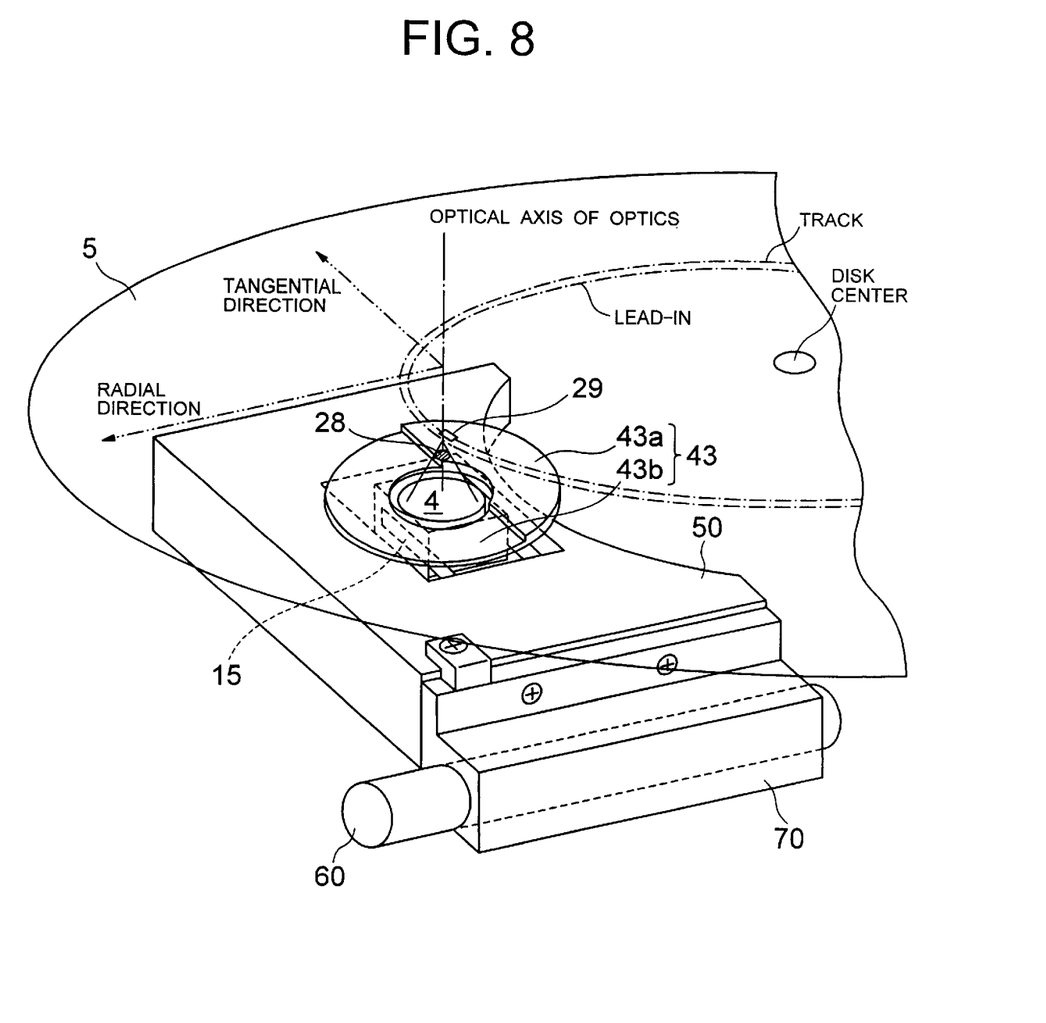
FIG. 8 is a schematic perspective view showing an optical pickup device of another embodiment according to the present invention.

FIG. 8 is the second example having such a form that a buffer pad contacts on an inner peripheral side of the objective lens. In the figure, 43 is a buffer pad based on the invention, a contact portion 43a is an abutting part of the buffer pad, and 29 shows an innermost track position of the optical disc. The contact portion 43a is in such a position further on an inner side of the innermost track position 29.

From the finding by the inventors, contact occurs very often at a time of starting a music play in an optical disc having no especial flaws. This is due to the reason of possible cases that positional deviation occurs in an optical part resulting in a situation that unsuccessful contact occurs once per certain number of times upon retracting the lens, or a situation occurs due to aging that an optical part is dirty and an optical disc is low in reflectivity resulting in a failure of correct retraction first. The optical disc, such as CD and DVD, has an area called a lead-in area or TOC area (collectively referred to as a lead-in area) in the innermost peripheral area 29 to record information representative of an outline on an optical disc kind or content. This area is first reproduced to acquire required information for recording to or reproducing from the optical disc. That is, in some conventional structures, this innermost peripheral area is readily injured due to contact. Required information is not available depending on a degree of injury, resulting in occurrence of impossibility to use the entire optical disc.

Figure 9:
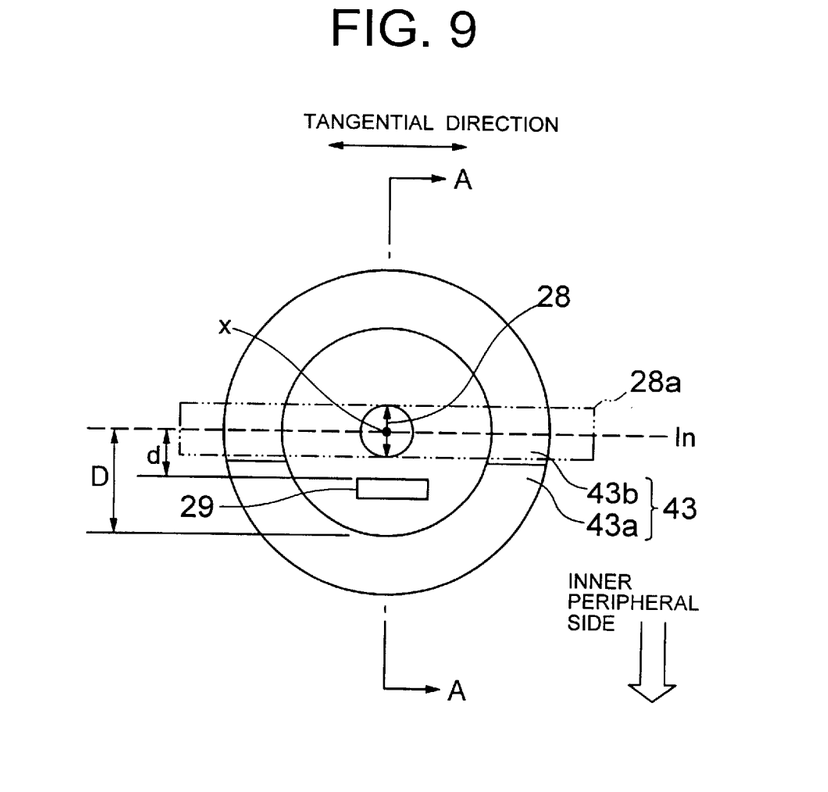
FIG. 9 is a plan view showing a buffer pad in an optical pickup device of another embodiment according to the invention.
Figure 10:
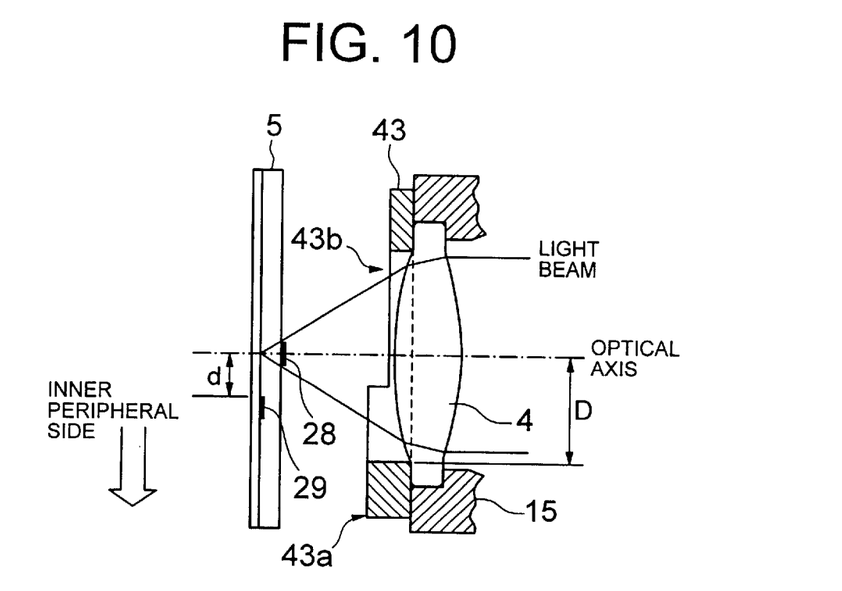
FIG. 10 is a sectional view taken along line A—A in FIG. 9.
Figure 11:
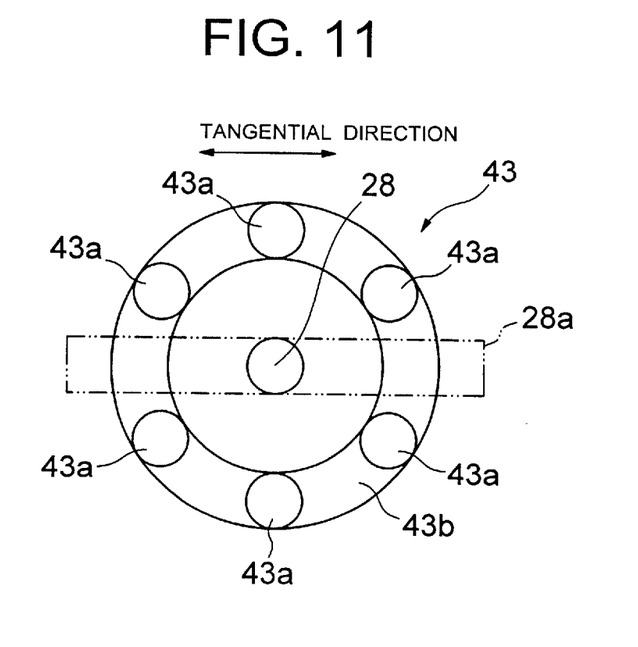
FIGS. 11 to 18 are plan views each showing a buffer pad in an optical pickup device of another embodiment according to the invention.
Figure 12:
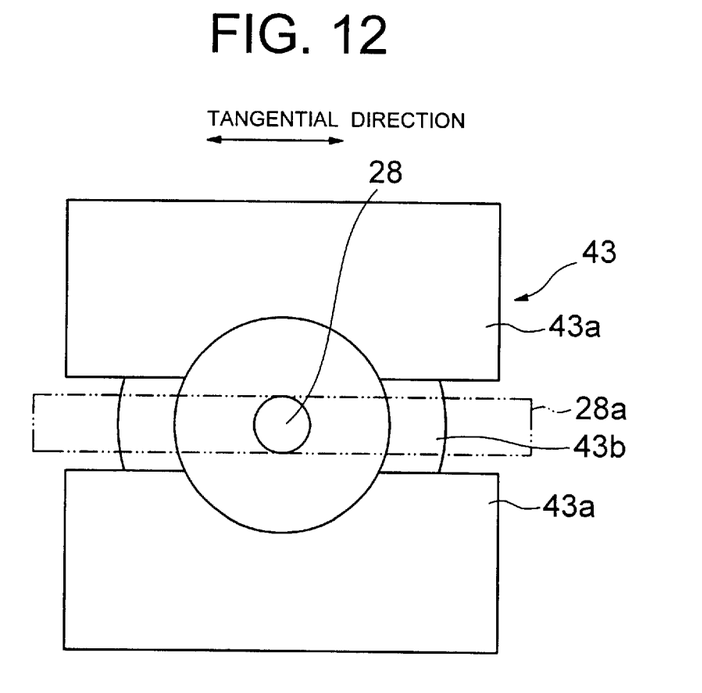
Figure 13:
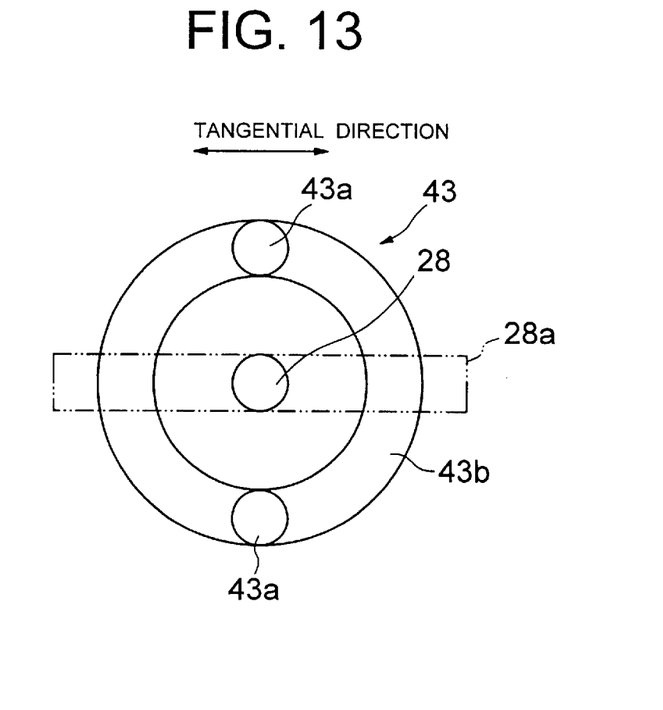
Figure 14:
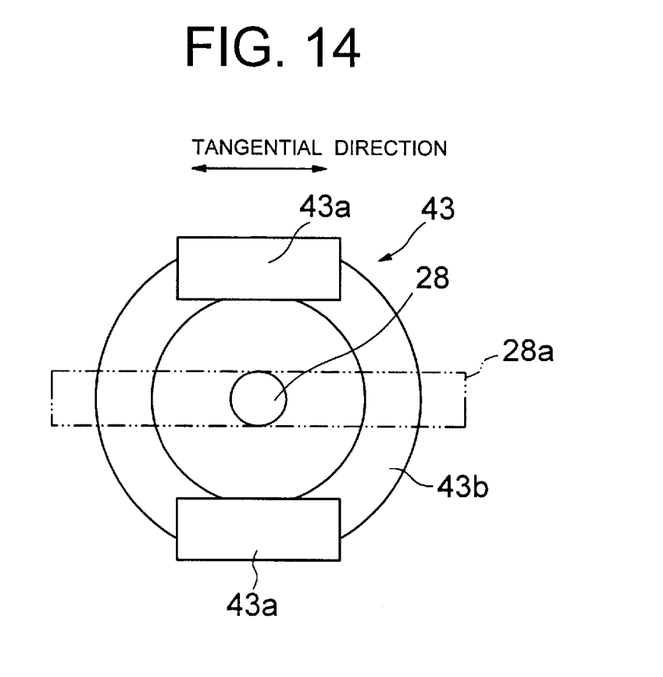
Figure 15:
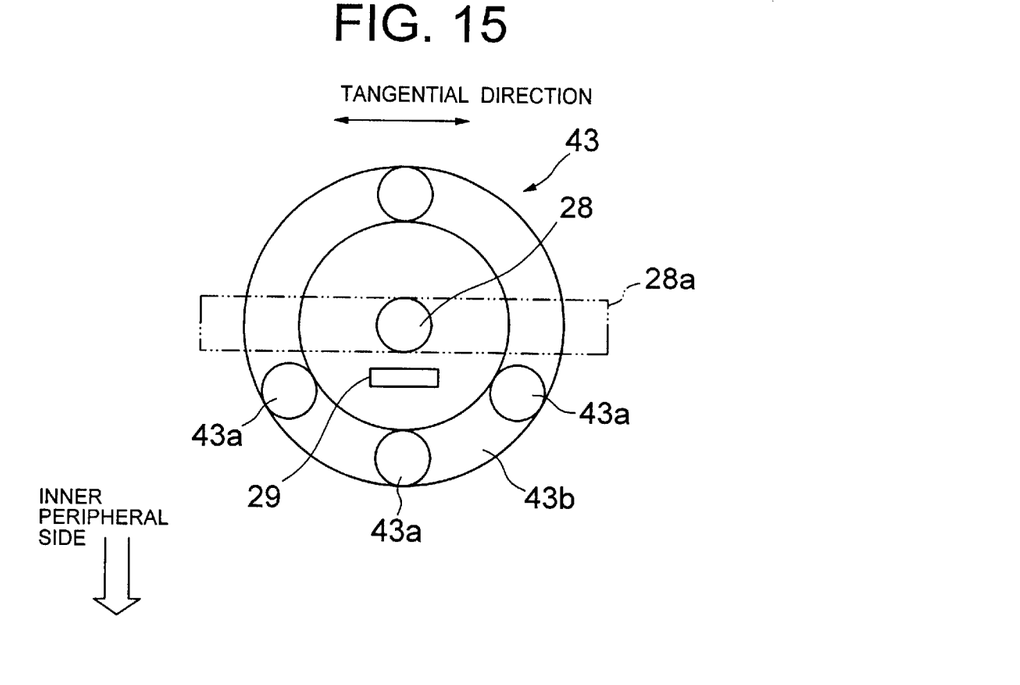
Figure 16:
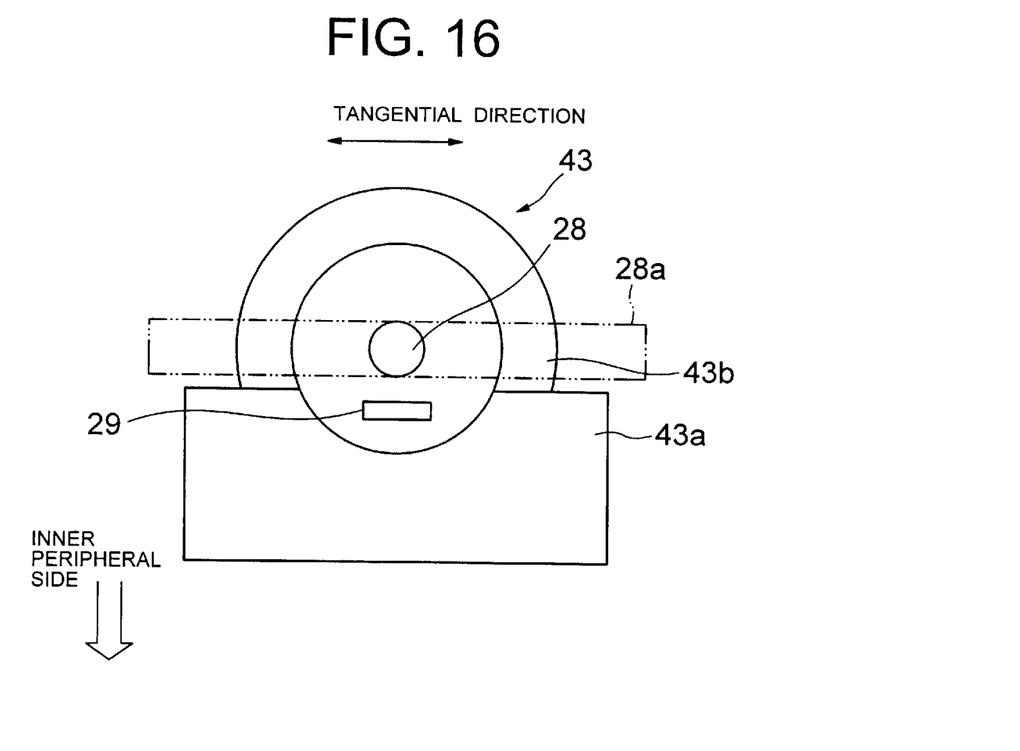
Figure 17:
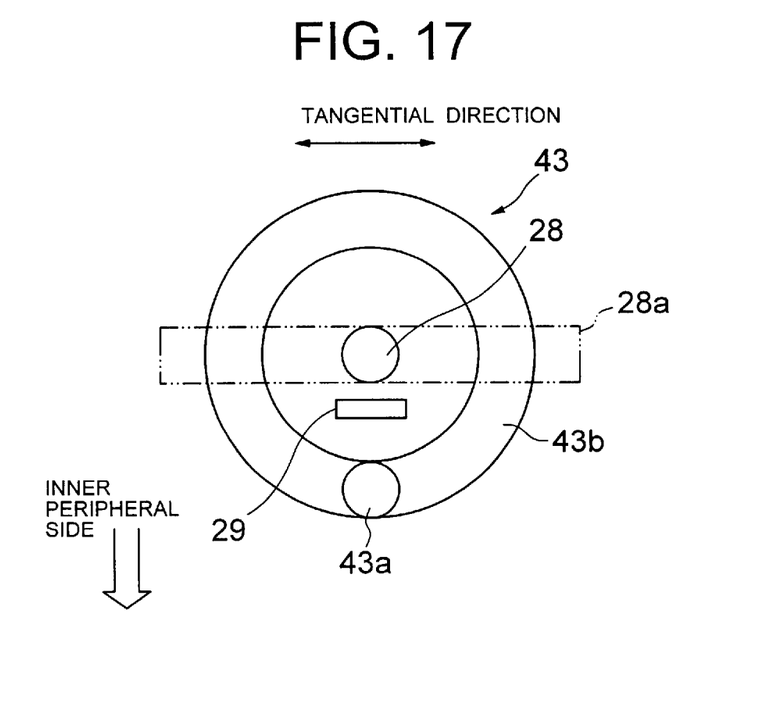
Figure 18:
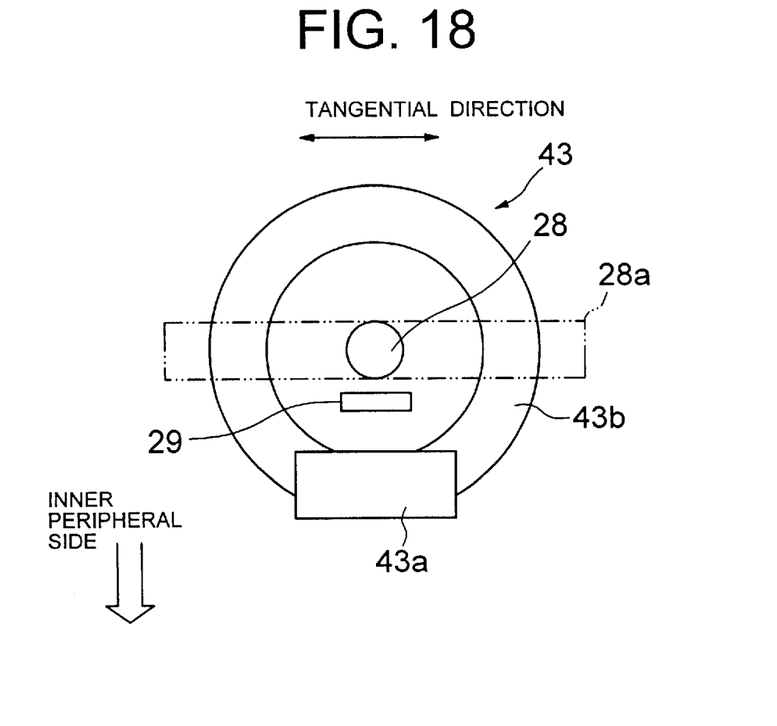

In the present invention as shown in FIGS. 9 and 10, the distance D between an objective-lens center position X in a disc radial direction and a position of a buffer-pad contact portion 43a is set great on an inner peripheral side than a distance of between a performance starting track position In for reproducing the first information and a signal recording innermost peripheral position 29. That is, the contact portion 43a is selected in shape such that the contact position that contact have occurred in reading a track for first reproducing information is positioned inward of the information recording area. Accordingly, even if contact occurs upon first performing retraction, the information area is not injured. Thus, there is no adverse affection in reading signals from then on.

Meanwhile, in an optical disc having a lead-in area recording predetermined information existing in the outer periphery, the contact portion 43a of the buffer pad is arranged such that that is positioned in an outer periphery than the lead-in area when the objective lens 4 is focusing a light beam onto the lead-in area. With this structure, the information area is not injured similarly to the above even if contact is encountered upon first performing retraction. Hence, there is no adverse affection in reading signals from then on.

The buffer pad of the invention, concerning the first example, may be designed in shape such that a colliding part does not exist in a path of a light spot of reading the track. In other embodiments, various shapes of structures are possible, as shown in FIGS. 7 to 10, i.e. a buffer pad 43 formed by a plurality of contact portions 43a arranged annular on a non-contact portion 43b, a buffer pad 43 formed by a pair of rectangular contact portions 43a sandwiching a non-contact portion 43b, a buffer pad 43 formed by a pair of circular contact portions 43a arranged in a disc radial direction on an annular non-contact portion 43b, or a buffer pad 43 formed by a pair of rectangular contact portions 43a arranged in a disc radial direction on an annular non-contact portion 43b.

Also, concerning the second example, when the pickup is in a position for reading a first signal that is to be assumed on an inner peripheral side, the contact portion 43a may be on an inner peripheral side of an innermost track position 29. Accordingly, various shapes are to be structured as other embodiment as shown in FIGS. 15 to 18, i.e. a buffer pad 43 formed by a plurality of contact portions 43a arranged on an inner peripheral side of the innermost peripheral track position 29 and annular on a non-contact portion 43b, a buffer pad 43 formed by a rectangular contact portion 43a arranged on an inner peripheral side of the innermost peripheral track position 29, a buffer pad 43 formed by circular contact portions 43a arranged on an inner peripheral side of the innermost peripheral track position 29 and in a disc radial direction on an annular non-contact portion 43b, or a buffer pad 43 formed by a rectangular contact portion 43a arranged on an inner peripheral side of the innermost peripheral track position 29 and in a disc radial direction on an annular non-contact portion 43b.

Also, concerning the non-contact portion 43b other than the first-collision part (contact portion 43a), it is possible to prevent against injury upon collision for the first time by slightly reducing the thickness without completely omitting the buffer pad. Where such a slight thickness change is provided and collision occurs with further greater force, an equivalent effect is obtained with a structure that, soon after the contact portion 43a comes into collision, all other portion of the non-contact portion 43b goes into collision.

Figure 19:
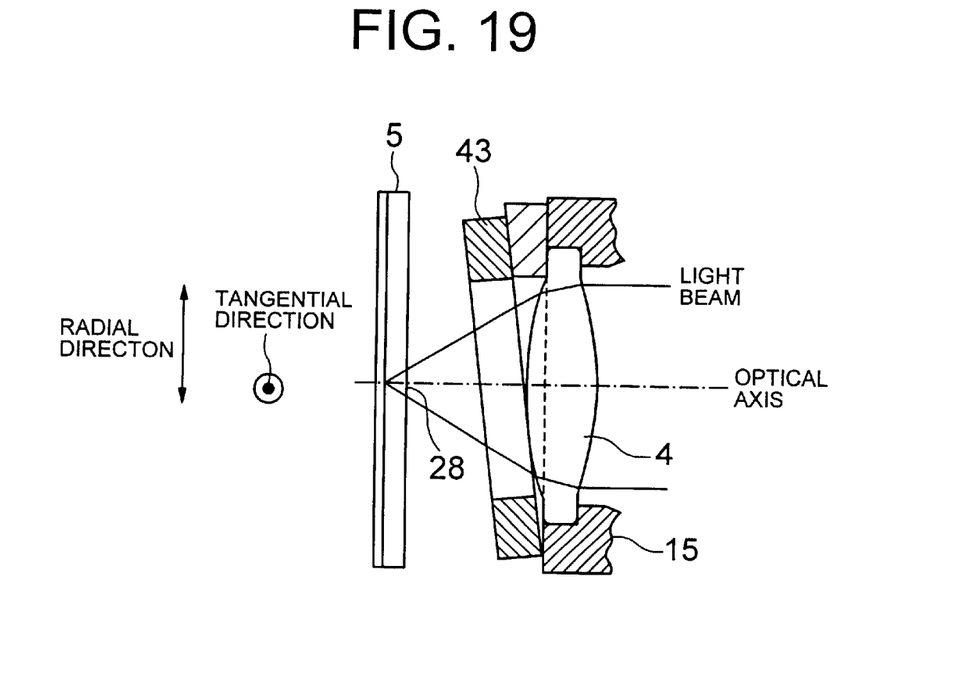
FIGS. 19 and 20 are sectional views of an optical pickup device of another embodiment according to the invention.
Figure 20:
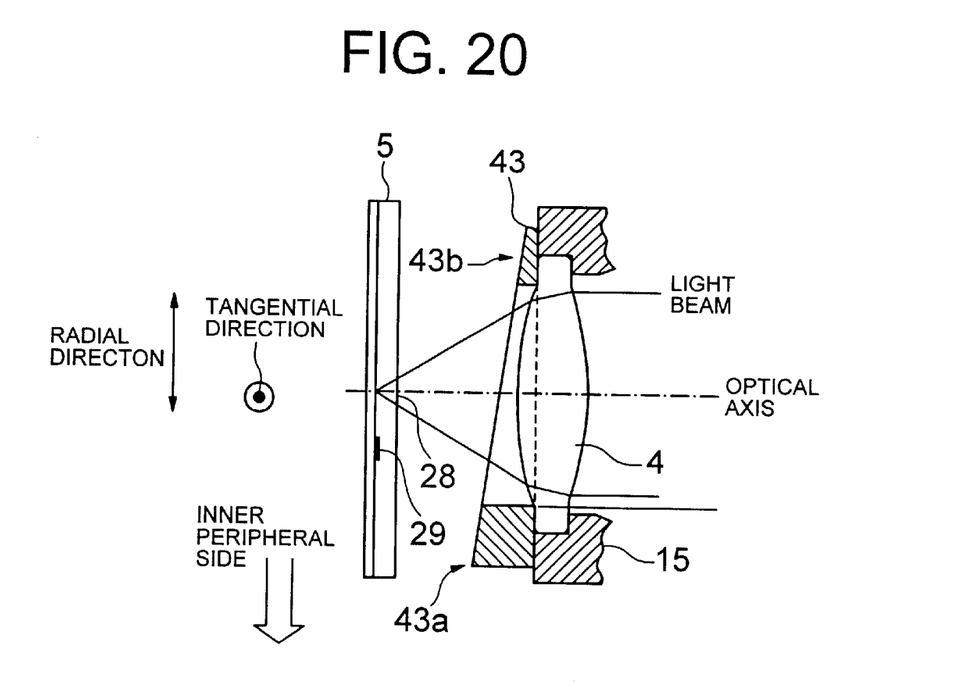

Concerning the structure as above, in the first example the pad may be mounted inclined in a disc radial direction toward an arbitrary direction excepting the light-spot path on a tangential line in a disc radial direction without changing the thickness of the buffer pad, as shown in FIG. 19. Also, in the second example, it is possible to structure as shown in FIG. 20 such that the buffer pad 43 at an inner peripheral side first comes into collision.

According to the present invention, even where the objective lens collides with an optical disc, the injury in the problematic point will not be deepened. suppressing the damage from spreading. Thus, the invention exhibits a great effect upon recording and reproducing to and from the optical disc ready to undergo affection such as of injury particularly due to density increase.

It is understood that the foregoing description and accompanying drawings set forth the preferred embodiments of the invention at the present time. Various modifications, additions and alternative designs will, of course, become apparent to those skilled in the art in light of the foregoing teachings without departing from the spirit and scope of the disclosed invention. Thus, it should be appreciated that the invention is not limited to the disclosed embodiments but may be practiced within the full scope of the appended claims. This application is based on a Japanese Patent Application No. 2000-203822 which is hereby incorporated by reference.

What is claimed is:

1. A pickup device in an apparatus for performing recording or reproducing, with relative movement, to or from an optical information recording medium recorded with information on a track, comprising:

an objective lens for focusing a light beam to a track on a recording surface of an optical information recording medium;

a drive part supporting said objective lens to control a position thereof relatively to said optical information recording medium; and a collision preventive device provided on said objective lens or drive part to prevent direct contact between said objective lens and a surface of said optical information recording medium; wherein said collision preventive device includes a contact portion to be contacted with the surface of said optical information recording medium earlier than said objective lens when said objective lens approaches the surface of said optical information recording medium and a non-contact portion provided adjacent said contact portion not to be contacted with the surface of said optical information recording medium in an area corresponding to a path of a light spot defined by a diameter of said light spot of a light beam on said track.

2. A pickup device according to claim 1, wherein said optical information recording medium is an optical disc recorded with information concerning said optical information-recording medium in a lead-in or lead-out region existing in an inner periphery or outer periphery thereof, said contact portion being positioned on an inner or outer side of said lead-in or lead-out region of said optical disc when said objective lens focuses a light beam to said lead-in or lead-out region.

* * * * *